United States Patent Office 3,046,123

Patented July 24, 1962

3,046,123

PROCESS FOR MAKING PRINTING PLATES AND LIGHT SENSITIVE MATERIAL FOR USE THEREIN

Oskar Süs, Wilhelm Neugebauer, and Maximilian Paul Schmidt, Wiesbaden-Biebrich, Germany, assignors, by mesne assignments, to Azoplate Corporation, Murray Hill, N.J.

No Drawing. Original application June 21, 1955, Ser. No. 517,086. Divided and this application Mar. 3, 1958, Ser. No. 718,477

Claims priority, application Germany Dec. 14, 1951

52 Claims. (Cl. 96—33)

The present invention relates to the production of light-sensitive material suitable for use in the graphic art. More particularly, it relates to a photomechanical method for the manufacture of printing plates and to light-sensitive material suitable for use in the said method.

In the U.S. patent application Serial No. 174,556, filed on July 18, 1950, by Maximilian Paul Schmidt, and now abandoned a process is described for producing printing plates by means of diazo compounds. According to this process diazo compounds that are constitutionally esters or amides of sulfo acids or carboxylic acids of 2-diazo-naphthol-(1) or of 1-diazo-naphthol-(2) are used to produce a light-sensitive layer on a base material. This layer is then exposed to light through a pattern, treated with alkali and heated. In said application it has also been shown that modifications of the procedure are possible by providing for the addition of alkali-soluble resins or fatty acids to the light-sensitive layer and by dispensing with the heating subsequent to the development of the exposed layer.

The U.S. patent applications Serial No. 238,369, filed on July 24, 1951, by Oskar Süs, and Serial No. 268,148, filed on January 24, 1952, by Oskar Süs and Maximilian Paul Schmidt, both now abandoned, show that other orthoquinone diazides in the form of their sulfo-acid or carboxylic acid esters or amides, respectively are well suited for use as light-sensitive diazo compounds.

It has now been found that excellent results are obtained according to the processes disclosed in the patent applications referred to above by the use, as light-sensitive substances, of the sulfo acid amides of orthoquinone diazides conforming to the general formula $$D-SO_2-N\begin{matrix}\diagup Y-R \\ \diagdown R_1\end{matrix}$$

in which D is an ortho-quinone diazide radical, Y is an $—SO_2—$ or —CO— radical, R is an aryl, substituted aryl or amido radical, $R_1$ is an alkyl, aryl, or substituted aryl radical, and N, Y, R, and $R_1$ taken together form a heterocyclic ring.

The diazo compounds having the above indicated general formula are especially well suited for the purposes of this invention when R′ designates the residue of an orthoquinone diazide.

The diazo compounds of this invention excel by their great stability. They are readily soluble in most of the organic solvents, such as, for example, ethylene glycol monomethyl ether, dioxane and dimethyl-formamide, but are insoluble in cold water, thus making it possible to apply the light-sensitive substance uniformly to the base material and to provide layers that are not sensitive to moisture and, in consequence, are of good durability.

Suitable base materials for the light-sensitive layer are paper the surface of which may have undergone a special pretreatment, and metals, such as, for example, aluminum or zinc. The diazo compounds are applied, in a known manner as by whirl-coating, brushing, or spraying solutions of the compounds in organic solvents. Solvents having boiling points within the range of from 70° C. to 130° C. are preferred. The solvent is evaporated by thoroughly drying the light-sensitive layers. The addition of alkali-soluble resins to the sensitizing solutions frequently proves advantageous for the formation of a uniform film-like coat. Also said resins tend to prevent the formation of centres of crystallization which cause the layer to break. Furthermore, the addition of resins improves the adhesiveness of the layer to the base material. It is possible also to prevent the formation of crystals on the surface of the layer by employing mixtures of two or more diazo compounds.

Images are produced on the light-sensitive material in the well-known manner by exposing the layer side of the material to light through a transparent pattern. Depending on the color of the diazo compound used, an image is produced that is more or less clearly visible. The diazo compound remains unchanged at the places not affected by light, while it is decomposed at the places exposed to light. In most cases the light-decomposition products are colorless. Sometime, however, a slight coloring appears in the background of the image as a result of secondary reactions of the light-decomposition product.

Whenever it is intended to use the layer bases as printing plates, it is necessary to develop the produced image by removing the light-decomposition product, because the light-decomposition product is just as oleophilic as the non-decomposed diazo compound and would retain greasy ink as does the diazo compound. The image is developed by treating the exposed material with weak alkalies. The diazo compound is insoluble or not readily soluble in weak alkalies whereas the light-decomposition product is removed. The different behaviour of the light-decomposition product and the undecomposed diazo compound with weak alkalies is explainable by the fact that under the influence of light compounds containing carboxyl groups are formed from the diazo compound. (O. Süs, Justus Liebig's Annalen der Chemie, volume 556 (1944), pages 65 ff.) It is readily understood, therefore, that diazo compounds best suited for the development of the image are those in which the acyl group linked to the nitrogen atom of the acid amide group contains a quinone-diazide residue. The light-decomposition products of such diazo compounds contain several carboxyl groups and the selective separation from the diazo compound is considerably facilitated when the exposed layer is treated with diluted alkalies.

Many of these diazo compounds after exposure can be developed by means of organic solvents for the purpose of making positive printing plates from negative patterns and vice versa.

In most cases the image shows a greenish-yellow color after being developed. In practice, it is desirable to obtain images that are as deeply colored and as rich in contrast as possible, whereby the progress of the image formation may be readily observed. Variation of the acyl residues linked to the nitrogen atom of the sulfonamide group may produce a deeper color shade of the respective diazo compounds. By using diazo compounds that show a stronger coloring, it is possible to produce layers that yield images ranging in color from brownish-yellow to brownish-red. In many cases slight heating of the solutions of the diazo compound, and in particular diazo compounds that contain at least one o-quinone-diazide residue belonging to the benzene series, makes it possible to obtain deeply brownish-yellow colored layers and images. It is possible also to greatly influence the color shades of the finished images by adding suitable dyes to the sensitizing solution.

The diazo compounds to be used in accordance with the invention are not described in previous publications. They are insoluble in diluted alkalies and can be produced, for example, by reaction of either carboxylic acid chlorides or sulfonic acid chlorides with sodium salts of the sulfonamides, of the orthoquinone diazides. These sulfonamides, which are used as starting material, are obtained by causing primary organic bases to react with the chlorides of the orthoquinone-diazide sulfonic acids.

The diazo compounds to be used according to the invention may also be obtained by the condensation of orthoquinone diazide sulfochlorides with acylated primary bases.

The compounds shown below are referred to in the following examples which illustrate the present invention:

*Formula 1*

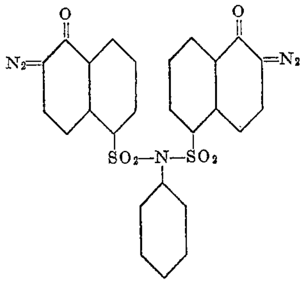

*Formula 2*

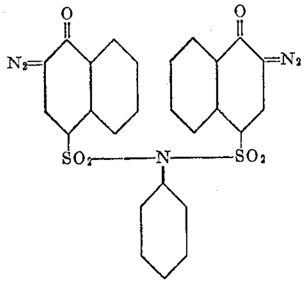

*Formula 3*

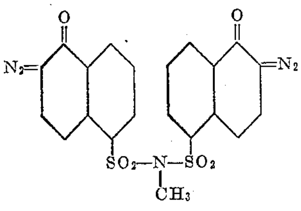

*Formula 4*

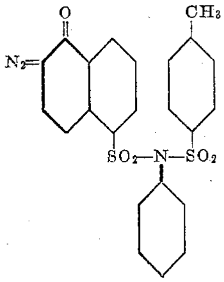

*Formula 5*

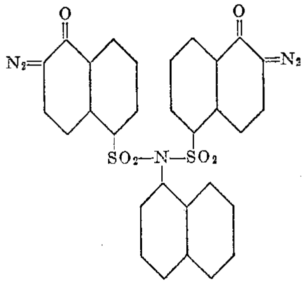

*Formula 6*

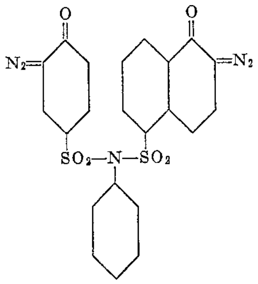

*Formula 7*

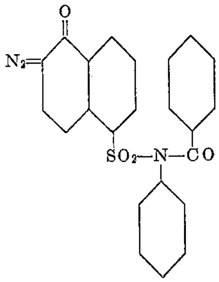

*Formula 8*

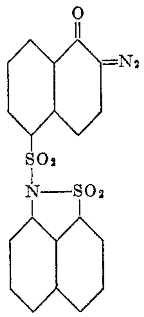

*Formula 9*

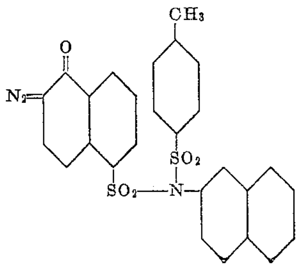

*Formula 10*

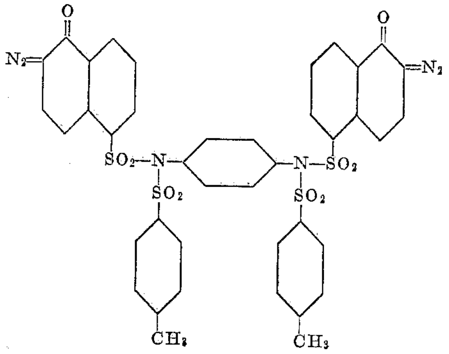

*Formula 11*

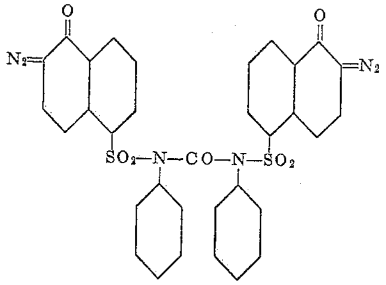

*Formula 12*

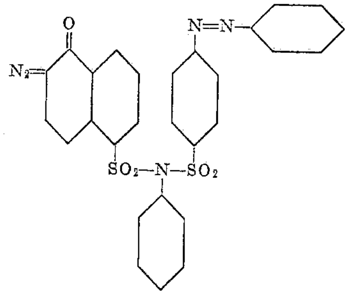

*Formula 13*

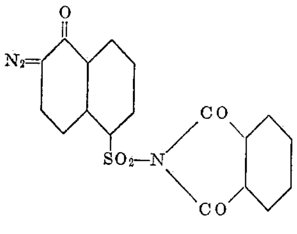

*Formula 14*

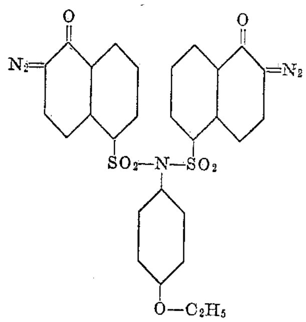

*Formula 15*

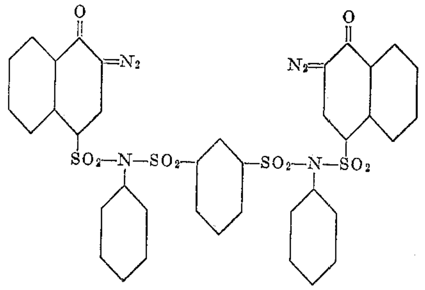

*Formula 16*

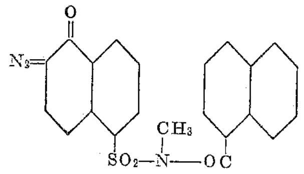

*Formula 17*

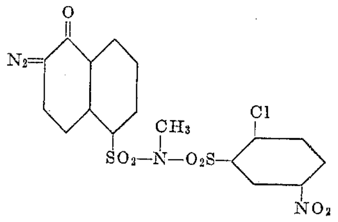

*Formula 18*

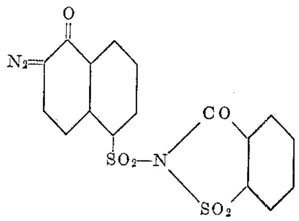

*Formula 19*

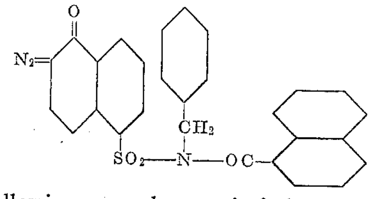

The following examples are included merely for the purpose of illustrating the above described process without any intention of restricting the scope of the invention.

(1) One part by weight of the diazo compound corresponding to Formula 1 in the above table is dissolved in one hundred parts by volume of ethylene glycol monomethyl ether, and this solution is applied by whirlcoating to an anodically oxidized aluminum foil. The coated side of the foil is dried in a warm aircurrent, and drying of the foil is then continued for about five minutes in a drying chamber at a temperature of 90° C. The sensitized material is exposed for three minutes to the light-rays emitted by an arc lamp (18 amperes, distance from the lamp about 70 cm.) behind a transparent positive pattern. A greenish-yellow-colored positive image of the pattern is obtained and is developed by wiping the image side of the exposed foil with a 1% solution of trisodium phosphate. The foil is then rinsed with water and subsequently treated with an aqueous solution containing 8% dextrin, 1% phosphoric acid, and 1% formaldehyde. The image can now be inked with greasy ink and used for printing.

The diazo compound conforming to No. 1 in the table may be prepared in the following manner:

Two mols of aniline and one mol of naphthoquinone-(1,2)-diazide-(2)-5-sulfochloride, dissolved in dioxane, form naphthoquinone - (1,2) - diazide - (2) - 5 - sulfanilide which, after recrystallization from glacial acetic acid melts at 160° C. under decomposition. 16 parts by weight of the sulfanilide (one mol) are dissolved in 200 parts by volume of dioxane and are converted into the sodium salt by the addition of 62 parts by volume of n-soda-lye (approximately 1.2 mols). The thus obtained alkaline reacting brownish-yellow solution is immediately mixed with a solution of 16 parts by weight of naphthoquinone-(1,2)-diazide-(2)-5-sulfochloride (approximately 1.2 mols) in 100 parts by volume of dioxane. After this mixture has stood for about two days, the N,N-di-(naphthoquinone - (1,2) - diazide - (2) - 5 - sulfonyl)-aniline precipitates in the form of large yellow crystals. This diazo compound is separated, reduced to a fine powder in a weak aqueous solution of caustic soda, separated anew, and is washed with water. When heated rapidly in a capillary tube, the compound decomposes at a temperature of about 145° C., without appreciably changing its color.

(2) In the process described in Example 1 above, the diazo compound of Formula 2 may be used in the place of the diazo compound of Formula 1 with equal success. The diazo compound of Formula 2 is applied to the aluminum foil by whirlcoating a 1% solution of the diazo compound in dioxane, said solution containing 0.2% rosin.

The diazo compound conforming to No. 2 in the table may be prepared from naphthoquinone-(1,2)-diazide-(2)-4-sulfochloride and aniline in a manner analogous to that described above for preparation of the diazo compound used in Example 1. The intermediary product, naphthoquinone-(1,2)-diazide-(2)-4-sulfanilide, decomposes at a temperature of 129° C. In preparing the bis-sulfonyl compound from this intermediary product it is desirable to employ a somewhat larger excess (1.5 times) of the naphthoquinone-(1,2)-diazide-(2)-4-sulfochloride as well as of the soda solution as acid-binding agent. N,N - di - (naphthoquinone - (1,2) - diazide - (2) - 4 - sulfonyl) - aniline starts to decompose slowly, when heated in a capillary tube at a temperature of 130° C. and detonates at 155° C. while darkening.

(3) 1 part by weight of the diazo compound corresponding to Formula 3 is dissolved in 100 parts by volume of ethylene glycol-monomethyl ether, and this solution is used for coating an aluminum foil one side of which has been roughened mechanically. The thoroughly dried light-sensitive foil is used to produce an image as described in Example 1. The exposed side of the foil is brushed with a 1% solution of trisodium phosphate, briefly rinsed with water, and then treated with a 1% solution of phosphoric acid. In this case also, a positive image, which can be inked and then be used as a printing plate, is obtained from a positive pattern.

For preparing the diazo compound of the Formula 3 one mol of naphthoquinone-(1,2)-diazide-(2)-5-sulfochloride and two mols of monomethylamine are converted in dioxane into naphthoquinone-(1,2)-diazide-(2)-5-(N-methyl)-sulfonamide which decomposes at a temperature of 154° C. subsequent to its recrystallization from glacial acetic acid. The thus obtained sulfonamide is condensed with one more molecule of naphthoquinone-(1,2)-diazide-(2)-5-sulfochloride in the presence of a normal solution of caustic soda yielding N,N-di-(naphthoquinone-(1,2)-diazide-(2)-5-sulfonyl)-methyl-amine. The procedure followed is analogous to that used for the preparation of the diazo compound of Formula 1. On heating the diazo compound of the Formula 3 in a capillary tube, the compound starts to darken at a temperature of 130° C. and chars more and more when the heating to higher temperatures is contained.

(4) In the same manner as described in Example 3, an aluminum foil is coated with a 1% solution of the diazo compound corresponding to Formula 4 in methyl-ethyl-ketone containing an addition of 0.2% of rosin. The image produced by the exposure of the coated foil under a positive pattern is developed as explained in Example 3 and can be used as a positive printing plate.

The diazo compound corresponding with Formula 4 is obtained by the condensation of naphthoquinone-(1,2)-diazide-(2)-5-sulfanilide with p-toluene-sulfochloride following the method indicated for the preparation of the diazo compound of Formula 1. On heating the N-p-toluene - sulfonyl - N - (naphthoquinone - (1,2) - diazide-(2) - 5 - sulfonyl) - aniline for the purpose of determining its melting point, slow decomposition of the compound sets in at a temperature of 150° C. Further heating up to a temperature of about 190° C. leads to a tough black molten mass.

(5) A superficially roughened zinc plate is brushed for five minutes with a solution of 4 parts by weight of potassium-aluminum-sulfate in 100 parts by volume of a 4% solution of acetic acid. The plate is then rinsed with water, dried, and finally coated on a plate-whirler with a 1% solution of the diazo compound corresponding to Formula 5 in ethylene glycol-monomethyl ether. After exposing the sensitized plate under a positive pattern, the greenish-yellow-colored positive image is developed with a 2% solution of trisodium phosphate and is then briefly wiped over with a 5% solution of acid salts of the kind described, for instance, by Strecker in the German Patent No. 642,782. Finally, the image is inked with greasy ink.

In order to prepare the diazo compound corresponding to Formula 5, equimolecular quantities of naphthoquinone-(1,2)-diazide-(2)-5-sulfochloride and of α-naphthylamine are condensed in dioxane, to which pyridine is added as a hydrochloric-acid-binding agent. The naphthoquinone - (1,2) - diazide - (2) - 5 - N - α - naphthyl - sulfonamide thus obtained decomposes, when recrystallized from glacial acetic acid, at a temperature of 145° C. It is converted with another molecule of naphthoquinone-(1,2)-diazide-(2)-5-sulfochloride, analogously to the procedure described in Example 1, into N,N-di-(naphthoquinone - (1,2) - diazide - (2) - 5 - sulfonyl) - α - naphthylamine which decomposes, when rapidly heated in a capillary tube, at a temperature of about 150° C. without any material change of color.

(6) The casein-containing layer side of a paper foil, produced in accordance with U.S. Patent No. 2,534,588 and coated on one side with a layer comprising casein and clay and hardened by means of formaldehyde, is coated by brushing with the solution of 1 part by weight of the diazo compound corresponding to Formula 6 in 100 parts by volume of ethylene glycol-monomethyl ether. After the light-sensitive layer has been dried, the foil is exposed to light under a transparent positive pattern, and the image thus obtained is developed with a 1% solution of trisodium phosphate. This image is yellow-orange-colored on a practically white background. This image, which is positive with respect to the pattern, is wiped over with a solution containing ammonium phosphate, glycerin, and phosphoric acid, and can be used as a printing plate after being inked with greasy ink.

The diazo compound corresponding to Formula 6 is obtained by the condensation of naphthoquinone-(1,2)-diazide-(2) - 5 - sulfanilide with benzoquinone - (1,2)-diazide-(2)-4-sulfochloride analogously to the method indicated for the production of the diazo compound corresponding to Formula 1. The N-[benzoquinone-(1,2)-diazide - (2) - 4 - sulfonyl] - N - [naphthoquinone - (1,2) - diazide - (2) - 5 - sulfonyl] - aniline decomposes at a temperature of 148° C. after changing to red in color.

(7) 0.8 part by weight of the diazo compound corresponding to Formula 7, 0.08 part by weight of 1-benzene-azo-2-hydroxy-3-naphthoic acid, and 0.16 part by weight of a formaldehyde-phenol-novolak are dissolved in 100 parts by volume of ethylene glycol-monomethyl ether. The formaldehyde-phenol-novolak is sold, for instance, by the firm Chemische Werke Albert at Wiesbaden-Biebrich under the commercial name "Alnovol" (registered trademark in Germany). This solution is used for coating a mechanically roughened aluminum foil. After drying, the coated foil is exposed to light under a positive pattern as described in Example 1, and a violet-red-colored positive image is developed by dabbing the exposed layer with a 2% solution of trisodium phosphate. The background of the image is then cleaned by a treatment with a solution containing 8% of dextrin, 1% of phosphoric acid, and 1% of formaldehyde.

The diazo compound corresponding to Formula 7 is prepared, analogously to the procedure described in the previous examples, by causing naphthoquinone-(1,2)-diazide-(2)-5-sulfanilide to react with benzoyl chloride. When heated, the N-benzoyl-N-[naphthoquinone-(1,2)-diazide-(2)-5-sulfonyl]-aniline first takes on a brown color and afterwards decomposes at a temperature of 170° C.

(8) 1.5 parts by weight of the diazo compound corresponding to Formula 8, being the condensation product of naphthoquinone-(1,2)-diazide-(2)-5-sulfochloride and 1,8-naphthsultam, are dissolved in 100 parts by volume of ethylene glycol-monomethyl ether. This solution is applied in the customary manner as a thin layer to a mechanically roughened aluminum foil. After drying, the layer is exposed to light under a transparent positive pattern, and the indistinctly visible yellow image is developed with a 3% solution of trisodium phosphate. Following development, the foil is rinsed with water and wiped over with a diluted solution of phosphoric acid. When the stable positive image thus obtained is inked with greasy ink, it is possible to use it for printing copies in the customary manner. The condensation product corresponding to Formula 8 is obtained in the following manner:

2 parts by weight of 1,8-naphthsultam are dissolved in 15 parts by volume of dioxane. To this solution there are added 2.7 parts by weight of naphthoquinone-(1,2)-diazide-(2)-5-sulfochloride in approximately 12 parts by volume of dioxane and 5 parts by volume of water. Then 16 parts by volume of a 10% solution of soda are added dropwise into the reaction mixture at a temperature of 40°–50° C., while agitating the reaction mixture. A yellow product gradually separates, the quantity of which is increased by addition of 50 parts by volume of water into the reaction vessel at the end of the reaction. Subsequent to cooling, the separated condensation product is isolated by means of a suction filter and is washed neutral with water. It is dried and recrystallized from benzene to which a little dioxane has been added. When heated, the compound begins sintering at a temperature of approximately 210° C. and decomposes at from 225° C. to 230° C.

(9) The condensation product corresponding to Formula 9, which is the reaction product of naphthoquinone-(1,2)-diazide-(2)-5-sulfochloride and p-toluene-sulfone-β-naphthylamide, can be used in a similar manner for producing images and printing plates. It is produced by adding to a solution of 2.9 parts by weight of p-toluene-sulfone-β-naphthyl amide in 20 parts by volume of dioxane 2.7 parts by weight of naphthoquinone-(1,2)-diazide-(2)-5-sulfochloride in 12 parts by volume of dioxane. 12 parts by volume of a 10% solution of soda are added dropwise while the reaction mixture is heated to a temperature of 50° C. The condensation is completed in approximately half an hour. Then the mixture is poured into approximately 300 parts by volume of water, and 10 parts by volume of a 10% solution of caustic soda are added. The condensation product thus precipitated is filtered off by suction and is washed neutral with water. Subsequent to drying at a temperature of 50° C. it constitutes a yellow powder that is insoluble in acids and diluted alkalies. For purification the raw product is dissolved in benzene, and the solution is treated with animal charcoal. After filtering the solution, gasoline is added whereupon the new diazo compound N-p-toluene-sulfonyl - N - [naphthoquinone - (1,2) - diazide - (2) - 5-sulfonyl]-p-naphthylamine separates. It is filtered and dried. On heating the new compound, decompostiion begins at a temperature of 190° C. In the presence of soda lye and a solvent the condensation product couples with phloroglucinol to form a violet dye which turns orange on addition of acids.

(10) 1 part by weight of the diazo compound corresponding to Formula 10 is dissolved in 100 parts by volume of dimethyl-formamide. This solution is used for coating an aluminum foil in the customary manner. An image of a pattern is produced on the thoroughly dried foil in the customary manner and developed by means of a 5% solution of disodium phosphate. The positive image thus obtained is then wiped over with an aqueous solution containing 8% of dextrin, 1% of phosphoric acid, and 1% of formaldehyde, and then inked with greasy ink.

The diazo compound of Formula 10 is prepared by reacting 2.4 mols of naphthoquinone-(1,2)-diazide-(2)-5-sulfochloride with 1 mol of N,N-di-(p-toluene-sulfonyl)-p-phenylene-diamine in the presence of 2.4 mols of a normal caustic soda solution both reaction compounds being first dissolved in dioxane. After the reaction mixture has been allowed to stand for several hours, the precipitated condensation product is filtered off by suction, repeatedly reduced to a fine powder by treating with a weak aqueous solution of caustic soda, washed with water, and then dried. The N,N'-di-naphthoquinone-(1,2)-diazide - (2) - 5 - sulfonyl - N,N' - di - (p - toluene - sulfonyl)-p-phenylenediamine (Formula 10) slowly darkens, when heated in a melting-point capillary tube, at a temperature above 180° C. and decomposes at 230° C.

(11) The same results as obtained in Example 10 can be had by using the diazo compound of Formula 11 in the place of the quinone diazide of Example 10. Naphthoquinone-(1,2)-diazide-(2)-5-sulfanilide, described in Example 1, is used as starting material for the preparation of the diazo compound corresponding to Formula 11. Into the pyridine solution of this diazo compound phosgene is introduced at room temperature. The solution is then diluted with water and acidified with hydrochloric acid. N,N'-di-[naphthoquinone - (1,2) - diazide-(2)-5-sulfonyl]-N,N'-diphenyl-urea is obtained in the form of a yellow powder. It is twice digested with a highly diluted solution of caustic soda and then filtered off by suction and washed with water. When heated, the diazo compound begins darkening at a temperature of 140° C. and decomposes at a temperature of 260° C.

(12) 1 part by weight of the diazo compound corresponding to Formula 12 is dissolved in 100 parts by volume of ethylene glycol-monomethyl ether, and this solution is used for coating a superficially roughened aluminum foil. An image is produced on the light-sensitive material in the customary manner. It is developed by wiping over with a 1% solution of trisodium phosphate. A yellowish-green-colored image on a clean metallic background is obtained, which is briefly wiped over with a 1% solution of phosphoric acid. This positive image, obtained from a positive pattern, can then be inked with greasy ink and be used as a printing plate.

To prepare the diazo compound corresponding to Formula 12, the naphthoquinone-(1,2)-diazide-(2)-5-sulfanilide is caused to react with azobenzene-4-sulfochloride analogously to the procedure described in Example 4. The N - (azo-benzene - 4' - sulfonyl) - N - (naphthoquinone-(1,2-diazide-(2)-5-sulfonyl) - aniline, which is obtained in the form of an orange-yellow powder, decomposes at a temperature of 150° C. It dissolves in glycol-monomethyl ether, taking on a deep orange-yellow color.

(13) A 1% solution of the diazo compound corresponding to Formula 13 in ethylene glycol-monomethyl ether is applied to an aluminum foil by means of a plate-whirler. After thoroughly drying the layer side, the foil is exposed to light behind a positive transparent pattern, and a distinctly visible image, which is colored a yellowish green is produced. It is developed as a positive by wiping over with a 5% solution of disodium phosphate. The developed foil is briefly rinsed with water, and the image side is then wiped over with an aqueous solution containing 8% of dextrin, 1% of phosphoric acid and 1% of formaldehyde. The image is then inked with greasy ink. The foil can be used as a printing plate in any of the usual printing machines.

The diazo compound corresponding to Formula 13 is prepared by combining 2.8 parts by weight of naphthoquinone-(1,2)-diazide-(2)-5-sulfochloride (in 20 parts by volume of dioxane) with 1.86 parts by weight of phthalimide-potassium (in 7 parts by volume of water). After the brownish-yellow-colored solution has been allowed to stand for about one day in a cool place, the yellow-orange-colored N-phthaloylnaphthoquinone-(1,2) - diazide - (2)-5-sulfonamide corresponding to Formula 13 separates in the form of crystals. The sulfonamide is insoluble in diluted soda lye. When heated in a capillary tube, the new compound begins to darken at a temperature of 210° C. and decomposes at 245° C.

(14) Analogously to the method indicated in Example 1, printing plates are produced by using the diazo compound corresponding with Formula 14. N,N-di-[naphthoquinone - (1,2) - diazide - (2) - 5 - sulfonyl]-p-phenetidine decomposes slowly, when heated in a capillary tube, and chars at a temperature of 265° C.

(15) Analogously to the process described in Example 13, images are produced on an aluminum foil that is sensitized with a diazo compound having the Formula 15, and are developed for the purpose of obtaining printing plates:

The diazo compound of the Formula 15 is produced by dissolving in dioxane 2 mols of naphthoquinone-(1,2)-diazide-(2)-4-sulfanilide and adding to this solution, at normal temperature, first 2 mols of n-caustic soda followed by 2 mols of 1,3-benzene-disulfochloride dissolved in dioxane. After standing for a short period of time a solid body of yellow-brownish color crystallizes out from the reaction mixture. The chemical constitution of this solid is illustrated by Formula 15. Recrystallized from glacial acetic acid, the compound on heating in a capillary tube starts sintering at 190° C. and decomposing at 220° C., after previous dark-coloration.

(16) 1.3 parts by weight of naphthoquinone-(1,2)-diazide-(2)-5-sulfonic acid-methylamide (which melts at 154° C. under decomposition) are suspended in 25 parts by volume of dioxane and then caused to dissolve by adding 3 parts by volume of 2-n-caustic soda solution and 5 parts by volume of water. 1 part by weight of 1-naphthoic acid chloride in 5 parts by volume of dioxane is quickly added to the solution at a temperature of about 10° C., and the mixture is then left standing for 2 hours. When the reaction solution is poured into ice water, the reaction product separates in the form of an oil. The oil is separated from the water, and, when mixed with some methanol, it decomposes to a crystalline mass. After recrystallization from ethanol, it represents a yellow diazo compound which decomposes at 149°–150° C. and corresponds to Formula 16.

A 1% solution of the diazo compound corresponding to Formula 16 in ethylene glycol monomethyl ether is coated on a roughened aluminum foil by means of a plate-whirler. The layer thus formed is first dried with warm air, and then for a short time at a temperature of 80°–90° C. The light-sensitive foil is exposed to light under a positive transparent pattern. A 5% disodium phosphate solution is used for the development of the exposed foil. The developed foil is then rinsed with water and wiped over with a 1% phosphoric acid. The positive image obtained of the pattern is inked with greasy ink, and the foil is used as a printing plate for the production of copies.

(17) To a solution of 1.25 parts by weight of 1-chloro-4-nitrobenzene-2-sulfonic acid methyl amide in 10 parts by volume of dioxane, first a mixture of 3 parts by volume of an 8% caustic soda solution and 5 parts by volume of water; then immediately thereafter, a solution of 1.35 parts by weight of naphthoquinone-(1,2)-diazide-(2)-5-sulfochloride in 10 parts by volume of dioxane is added while the temperature is kept at about 10° C. The reaction mixture is left standing in a refrigerator, and the condensation product crystallizes out. For purification, the condensation product is recrystallized from glacial acetic acid. The diazo compound, which corresponds to Formula 17, forms lemon-yellow needles which decompose at a temperature of 147°–148° C.

1 part by weight of the diazo compound corresponding to Formula 17 and 0.2 part by weight of an alkali-soluble non-hardenable formaldehyde phenol resin are dissolved in 100 parts by volume of ethylene glycol-monomethyl ether, and the solution is coated onto a roughened aluminum foil by means of a plate-whirler. After drying, the light-sensitive foil is exposed to light under a transparent positive pattern. Development of the exposed foil with a 1% trisodium phophate solution leads to a positive image, which is treated with a 1% phosphoric acid, and then inked with greasy ink. By means of this printing plate, copies can be printed.

(18) A solution of 2.6 g. of naphthoquinone-(1,2)-diazide-(2)-5-sulfochloride in 10 cc. of dioxane is added at room temperature to a solution of 1.83 g. of (o-sulfobenzoic-acid)-imide (saccharin) in a mixture of 15 cc. of dioxane and 2.5 cc). of water. While heating the reaction mixture to about 50° to 55° C., 16 cc. of a 10% soda solution are slowly added to the mixture. After half an hour the reaction mixture is allowed to cool whereby part of the yellow condensation product precipitates. It is drawn off, washed first with a 5% sodium hydroxide solution, then with water and dried at 50° C. By recrystallization of the condensation product from dioxane, yellow colored crystals are obtained which decompose at about 255° C. The diazo compound thus formed corresponds to Formula 18.

A 2% solution of the diazo compound corresponding to Formula 18 in glycol monomethyl ether is coated onto a roughened aluminum foil by means of a plate-whirler and well dried on the foil. Exposure of the light-sensitive foil is effected under a transparent positive pattern. The exposed foil is developed with a 5% solution of disodium phosphate and a positive image is obtained. The foil is then washed with water, treated with a 1% phosphoric acid, and inked with greasy ink, whereupon it is ready for printing.

(19) To a solution of 1.7 parts by weight of naphthoquinone-(1,2)-diazide-(2)-5-sulfonic acid benzylamide in 10 parts by volume of dioxane there are successively added, while shaking and keeping the temperature at about 10° C., 8 parts by volume of a 2.7% caustic soda solution and a solution of 1 part by weight of 1-naphthoic acid chloride in 10 parts by volume of dioxane. The reaction mixture is left standing for 2 to 3 hours and is then poured into ice water. An oily prduct separates which is treated with cold methanol after the water is removed and decomposes into a crystalline mass. By recrystallizing from an ethyl acetate/gasoline mixture yellow colored crystals are obtained which decompose at 163° to 165° C. This diazo compound corresponds to Formula 19.

A 1% solution of the diazo compound corresponding to Formula 19 dissolved in a mixture of dimethyl formamide and ethylene glycol-monomethyl ether (1:3) is coated on a roughened aluminum foil by means of a plate-whirler and dried for 5 minutes at a temperature of 90°

C. After exposing the light-sensitive foil under a positive transparent pattern, the exposed layer is developed by means of a 0.25% trisodium phosphate solution. A positive image is obtained which is first wiped over with a 1% phosphoric acid solution, to which some gum arabic and/or formaldehyde may be added, and then inked with greasy ink. The foil may now be used for printing copies.

This application is a division of application Serial No. 517,086, filed June 21, 1955, which is, in turn, a continuation-in-part of application Serial No. 325,446, filed December 11, 1952, and now abandoned.

What is claimed is:

1. A compound having the formula $$D-SO_2-N\begin{matrix} Y-R \\ R_1 \end{matrix}$$

in which D is an ortho-quinone diazide radical, Y is selected from the group consisting of $-SO_2-$ and $-CO-$ radicals, R is selected from the group consisting of aryl and amido groups, $R_1$ is selected from the group consisting of alkyl and aryl groups and groups which together with R from a heterocyclic ring.

2. A compound having the formula $$D-SO_2-N\begin{matrix} SO_2-R \\ R_1 \end{matrix}$$

in which D is an ortho-quinone diazide radical and R and $R_1$ are aryl groups.

3. A compound having the formula $$D-SO_2-N\begin{matrix} CO-R \\ R_1 \end{matrix}$$

in which D is an ortho-quinone diazide radical, and R and $R_1$ are aryl groups.

4. A compound having the formula $$D-SO_2-N\begin{matrix} CO-R \\ R_1 \end{matrix}$$

in which D is an ortho-quinone diazide radical, R is an amido group, and $R_1$ is an aryl group.

5. A compound having the formula $$D-SO_2-N\begin{matrix} Y-R \\ R_1 \end{matrix}$$

in which D is an ortho-quinone diazide radical, Y is an $-SO_2-$ group, and $R_1$ together with N, Y, and R forms a heterocyclic ring.

6. A compound having the formula $$D-SO_2-N\begin{matrix} Y-R \\ R_1 \end{matrix}$$

in which D is an ortho-quinone diazide radical, Y is a $-CO-$ group, and $R_1$ together with N, Y, and R forms a heterocyclic ring.

7. A compound having the formula

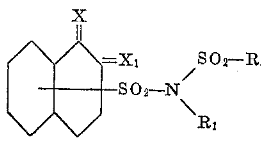

in which X and $X_1$ are selected from the group consisting of $N_2$ and O and are different, and R and $R_1$ are aryl groups.

8. A compound having the formula

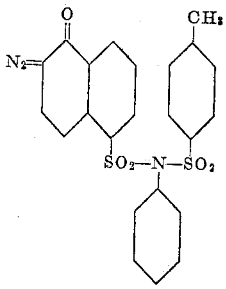

9. A compound having the formula

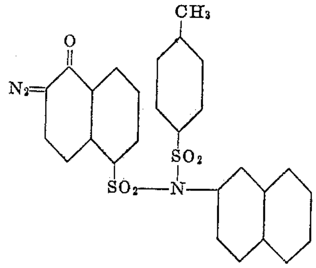

10. A compound having the formula

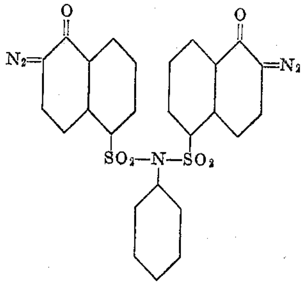

11. A compound having the formula

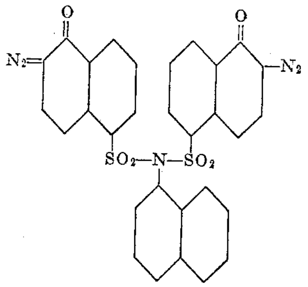

12. A compound having the formula

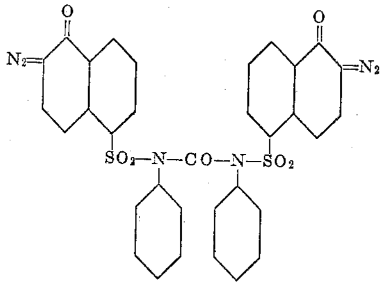

13. A presensitized printing plate comprising a base material having a coating thereon comprising a compound having the formula $$D-SO_2-N\begin{matrix} Y-R \\ R_1 \end{matrix}$$

in which D is an ortho-quinone diazide radical, Y is selected from the group consisting of $-SO_2-$ and $-CO-$ radicals, R is selected from the group consisting of aryl and amido groups, $R_1$ is selected from the group consisting of alkyl and aryl groups and groups which together with R form a heterocyclic ring.

14. A presensitized printing plate comprising a base material having a coating thereon comprising a compound having the formula

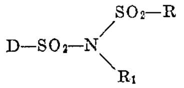

in which D is an ortho-quinone diazide radical, and R and $R_1$ are substituted aryl groups.

15. A presensitized printing plate comprising a base material having a coating thereon comprising a compound having the formula

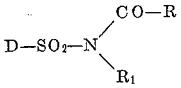

in which D is an ortho-quinone diazide radical, and R and $R_1$ are aryl groups.

16. A presensitized printing plate comprising a base material having a coating thereon comprising a compound having the formula

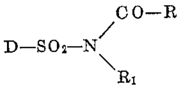

in which D is an ortho-quinone diazide radical, R is an amido group, and $R_1$ is an aryl group.

17. A presensitized printing plate comprising a base material having a coating thereon comprising a compound having the formula

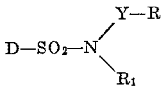

in which D is an ortho-quinone diazide radical, Y is an —$SO_2$— group, and $R_1$ together with N, Y, and R forms a heterocyclic ring.

18. A presensitized printing plate comprising a base material having a coating thereon comprising a compound having the formula

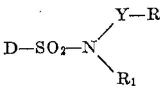

in which D is an ortho-quinone diazide radical, Y is a —CO— group, and $R_1$ together with N, Y, and R forms a heterocyclic ring.

19. A presensitized printing plate comprising a base material having a coating thereon comprising a compound having the formula

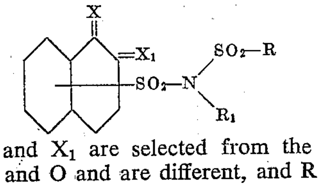

in which X and $X_1$ are selected from the group consisting of $N_2$ and O and are different, and R and $R_1$ are aryl groups.

20. A presensitized printing plate comprising a base material having a coating thereon comprising a compound having the formula

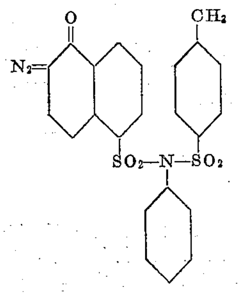

21. A presensitized printing plate comprising a base material having a coating thereon comprising a compound having the formula

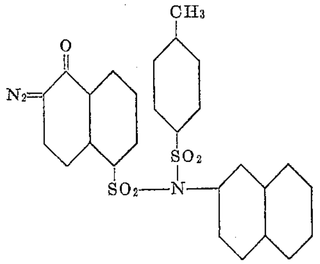

22. A presensitized printing plate comprising a base material having a coating thereon comprising a compound having the formula

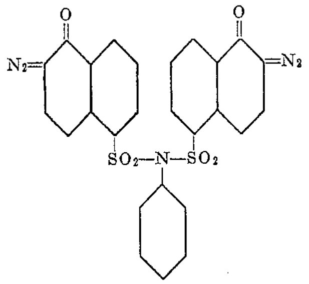

23. A presensitized printing plate comprising a base material having a coating thereon comprising a compound having the formula

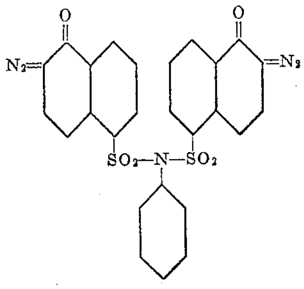

24. A presensitized printing plate comprising a base material having a coating thereon comprising a compound having the formula

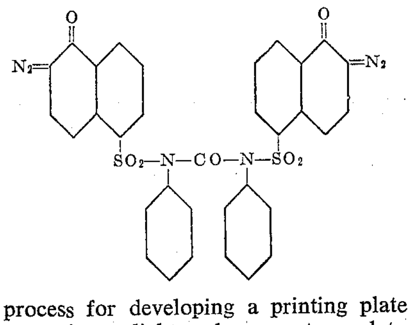

25. A process for developing a printing plate which comprises exposing to light under a master a plate having a compound thereon of the formula

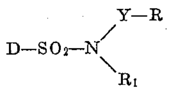

in which D is an ortho-quinone diazide radical, Y is selected from the group consisting of —$SO_2$— and —CO— radicals, R is selected from the group consisting of aryl and amido groups, $R_1$ is selected from the group consisting of alkyl and aryl groups and groups which together with R form a heterocyclic ring; to thereby form a decomposition product in the light struck areas and removing the decomposition product by treatment with a weakly alkaline solution.

26. A process for developing a printing plate which comprises exposing to light under a master a plate having a compound thereon of the formula

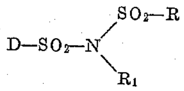

in which D is an ortho-quinone diazide radical and R and $R_1$ are aryl groups; to thereby form a decompositoin product in the light struck areas and removing the decomposition product by treatment with a weakly alkaline solution.

27. A process for developing a printing plate which comprises exposing to light under a master a plate having a compound thereon of the formula

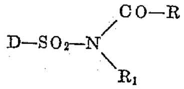

in which D is an ortho-quinone diazide radical, and R and $R_1$ are aryl groups; to thereby form a decomposition product in the light struck areas and removing the decomposition product by treatment with a weakly alkaline solution.

28. A process for developing a printing plate which comprises exposing to light under a master a plate having a compound thereon of the formula

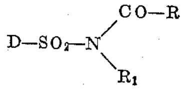

in which D is an ortho-quinone diazide radical, R is an amido group, and $R_1$ is an aryl group; to thereby form a decomposition product in the light struck areas and removing the decomposition product by treatment with a weakly alkaline solution.

29. A process for developing a printing plate which comprises exposing to light under a master a plate having a compound thereon of the formula

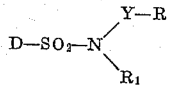

in which D is an ortho-quinone diazide radical, Y is an —$SO_2$— group and $R_1$ together with N, Y, and R forms a heterocyclic ring; to thereby form a decomposition product in the light struck areas and removing the decomposition product by treatment with a weakly alkaline solution.

30. A process for developing a printing plate which comprises exposing to light under a master a plate having a compound thereon of the formula

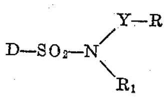

in which D is an ortho-quinone diazide radical, Y is a —CO— group, and $R_1$ taken together with N, Y, and R forms a heterocyclic ring; to thereby form a decomposition product in the light struck areas and removing the decomposition product by treatment with a weakly alkaline solution.

31. A process for developing a printing plate which comprises exposing to light under a master a plate having a compound thereon of the formula

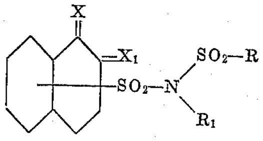

in which X and $X_1$ are selected from the group consisting of $N_2$ and O and are different, and R and $R_1$ are aryl groups; to thereby form a decomposition product in the light struck areas and removing the decomposition product by treatment with a weakly alkaline solution.

32. A process for developing a printing plate which comprises exposing to light under a master a plate having a compound thereon of the formula

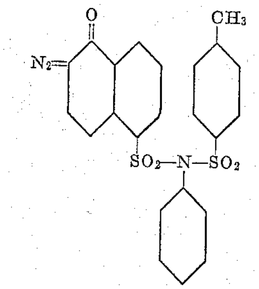

to thereby form a decomposition product in the light struck areas and removing the decomposition product by treatment with a weakly alkaline solution.

33. A process for developing a printing plate which comprises exposing to light under a master a plate having a compound thereon of the formula

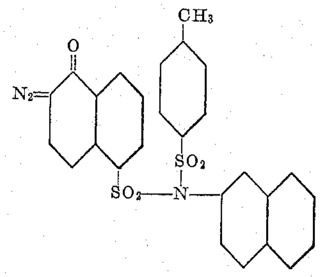

to thereby form a decomposition product in the light struck areas and removing the decomposition product by treatment with a weakly alkaline solution.

34. A process for developing a printing plate which comprises exposing to light under a master a plate having a compound thereon of the formula

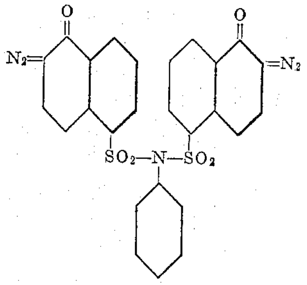

to thereby form a decomposition product in the light struck areas and removing the decomposition product by treatment with a weakly alkaline solution.

35. A process for developing a printing plate which comprises exposing to light under a master a plate having a compound thereon of the formula

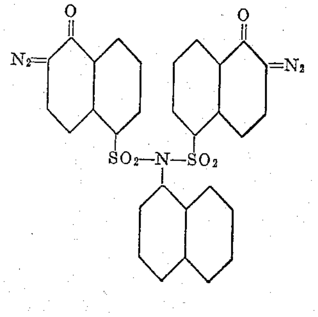

to thereby form a decomposition product in the light struck areas and removing the decomposition product by treatment with a weakly alkaline solution.

36. A process for developing a printing plate which comprises exposing to light under a master a plate having a compound thereon of the formula

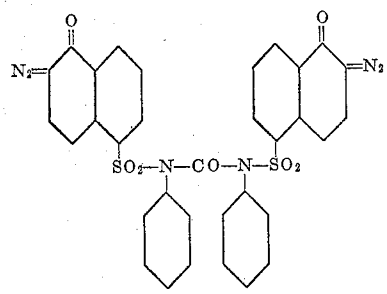

to thereby form a decomposition product in the light struck areas and removing the decomposition product by treatment with a weakly alkaline solution.

37. A compound having the formula

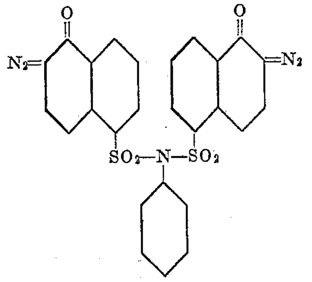

38. A compound having the formula

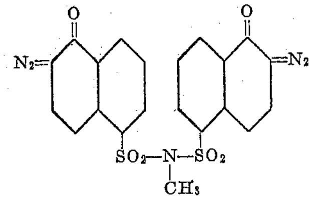

39. A compound having the formula

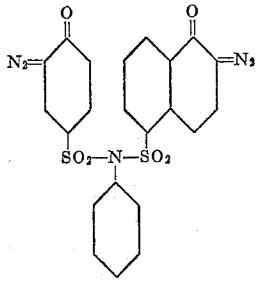

40. A compound having the formula

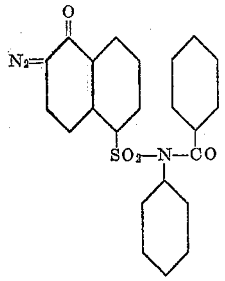

41. A compound having the formula

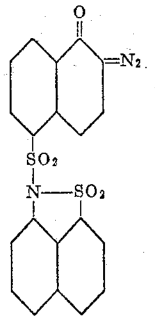

42. A compound having the formula

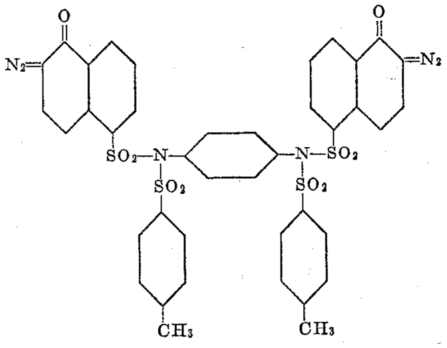

43. A compound having the formula

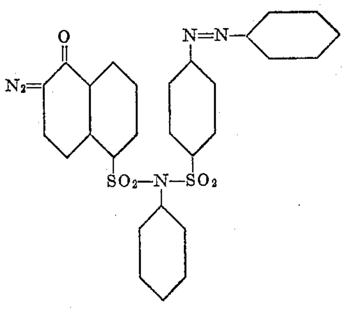

44. A compound having the formula

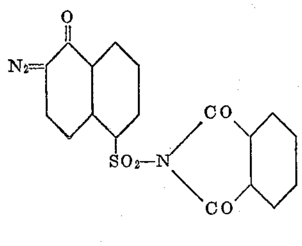

45. A compound having the formula

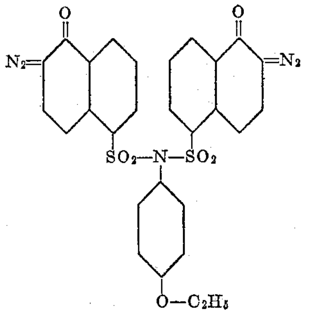

46. A compound having the formula

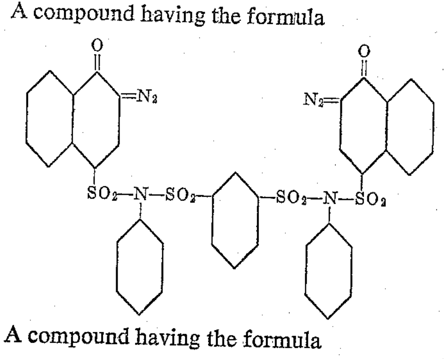

47. A compound having the formula

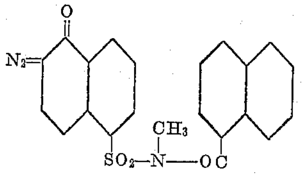

48. A compound having the formula

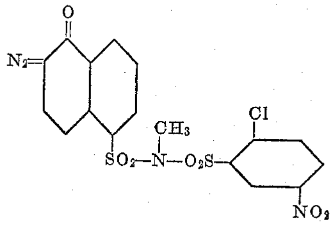

49. A compound having the formula

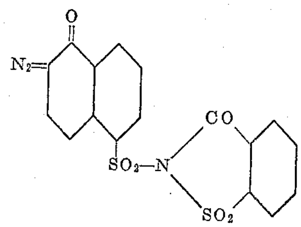

50. A compound having the formula

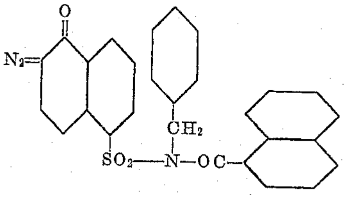

51. A presensitized printing plate according to claim 13 in which the coating includes an alkali-soluble resin.

52. A process according to claim 25 in which the compound is in admixture with an alkali-soluble resin.

References Cited in the file of this patent

FOREIGN PATENTS

| | | |
|---|---|---|
| 510,563 | Belgium | Apr. 30, 1952 |
| 516,129 | Belgium | Dec. 31, 1952 |
| 930,608 | Germany | July 21, 1955 |